(12) United States Patent
Resendes et al.

(10) Patent No.: US 7,662,480 B2
(45) Date of Patent: Feb. 16, 2010

(54) BUTYL IONOMER HAVING IMPROVED SURFACE ADHESION

(75) Inventors: Rui Resendes, Corunna (CA); Rayner Krista, Strathroy (CA); Janice Nicole Hickey, Gloucester (CA)

(73) Assignee: Lanxess, Inc., Sarnia, Ontario (CA)

( * ) Notice: Subject to any disclaimer, the term of this patent is extended or adjusted under 35 U.S.C. 154(b) by 469 days.

(21) Appl. No.: 11/709,485

(22) Filed: Feb. 22, 2007

(65) Prior Publication Data

US 2007/0218296 A1    Sep. 20, 2007

Related U.S. Application Data

(60) Provisional application No. 60/782,149, filed on Mar. 14, 2006.

(51) Int. Cl.
*B32B 27/28* (2006.01)
(52) U.S. Cl. .................. 428/462; 525/326.1; 525/329.5; 525/329.7; 525/329.8; 525/329.9; 525/330.2; 525/332.3; 526/242; 526/291
(58) Field of Classification Search .................. 428/462; 525/326.2, 329.5, 329.7, 329.8, 329.9, 330.2; 525/332.3; 526/242, 291
See application file for complete search history.

(56) References Cited

U.S. PATENT DOCUMENTS

| | | | | |
|---|---|---|---|---|
| 2,356,128 | A | | 8/1944 | Thomas et al. ................. 260/79 |
| 3,642,728 | A | * | 2/1972 | Canter ......................... 525/341 |
| 3,862,265 | A | | 1/1975 | Steinkamp et al. ...... 260/878 R |
| 4,007,149 | A | * | 2/1977 | Burton et al. ................. 524/574 |
| 4,048,258 | A | * | 9/1977 | Baldwin et al. .............. 525/285 |
| 4,102,876 | A | * | 7/1978 | Brenner et al. ............. 525/331.8 |
| 4,119,616 | A | * | 10/1978 | O'Farrell et al. ............. 525/344 |
| 4,256,857 | A | | 3/1981 | Buckler et al. ............... 525/331 |
| 4,749,505 | A | | 6/1988 | Chung et al. ............. 252/51.5 A |
| 5,336,705 | A | * | 8/1994 | Gorbaty et al. ................ 524/68 |
| 2001/0005699 | A1 | * | 6/2001 | Morgan et al. ............... 473/376 |

FOREIGN PATENT DOCUMENTS

| | | |
|---|---|---|
| CA | 2 418 884 | 8/2004 |
| CA | 2 458 741 | 8/2005 |
| EP | 1 591 480 | 11/2005 |
| GB | 1 497 383 | 1/1978 |
| WO | 02/31039 | 4/2002 |
| WO | 2007/022618 | 1/2007 |

OTHER PUBLICATIONS

Ullmanns Encyclopedia of Industrial Chemistry, vol. A 23, 1993, pp. 288-295; Elvers et al; "Refractory Ceramics to Silicon Carbide".
Morton, Maurice; "Rubber Technology" Third Edition, Chapter 10 (Van Nostrand Reinhold Company © 1987) pp. 297-300.
Parent, J.S.; Liskova, A.; Whitney, R.A.; Resendes, R.; Journal of Polymer Science, Part A: Polymer Chemistry 43, 5671-5679, 2005; "Ion-Dipole Interaction Effects in Isobutylene-based Ammonium Bromide Ionomers".
Parent, J.S.; Liskova, A.; Resendes, R.; Polymer 45, 8091-8096, 2004; "Iso butylene-based Ionomer composites: siliceous filler reinforcement".
Parent J.S.; Penciu, A.; Guillen-Castellanos, S.A.; Liskova, A.; Whitney, R.A.; Macromolecules 37, 7477-7483, 2004 "Synthesis and Characterization of Isobutylene-Based Ammonium and Phosphonium Bromide Ionomers".
The publication Bayer—Manual for the Rubber Industry 2nd Edition pp. 512-515 D10.1 Cohedur.
Encyclopedia of Polymer Science and Engineering, vol. 4, S. 66 et seq. (Compounding) A Wiley-Interscience Publication, 1986.
Encyclopedia of Polymer Science and Engineering, vol. 17, S. 666 et seq (Vulcanization) A Wiley-Interscience Publication.

* cited by examiner

*Primary Examiner*—Bernard Lipman
(74) *Attorney, Agent, or Firm*—Michael A. Miller

(57) ABSTRACT

A butyl rubber ionomer having improved adhesion to substrates whose surfaces have polar functional groups. Examples of such substrate materials include stainless steel, glass, mylar or Teflon®. The adhesion of the butyl rubber ionomer to the substrate is at least 25% greater than the adhesion of a non-ionomeric butyl rubber to the same substrate surface and with certain substrates is more than 150% greater. The adhesion is improved with increasing levels of multiolefin content in the butyl rubber ionomer. The adhesion is greatest for butyl rubber ionomers having a high multiolefin content (at least 3.5 mol% of multiolefin monomers or at least 1.5 mol % of residual multiolefins). By taking advantage of these high adhesion levels, a composite article can be formed between the butyl rubber ionomer and the substrate.

20 Claims, No Drawings

BUTYL IONOMER HAVING IMPROVED SURFACE ADHESION

This Application claims the benefit of U.S. Provisional Application Ser. No. 60/782,149 filed on Mar. 14, 2006.

FIELD OF THE INVENTION

The invention relates to butyl rubber ionomers having improved surface adhesion. More particularly, the invention relates to butyl rubber ionomers having improved adhesion to surfaces having polar surface functionalities, such as glass, stainless steel and mylar, especially for butyl rubber ionomers having elevated levels of isoprene (more than 3.0 mol %).

BACKGROUND

Poly(isobutylene-co-isoprene), or IIR, is a synthetic elastomer commonly known as butyl rubber which has been prepared since the 1940's through the random cationic copolymerization of isobutylene with small amounts of isoprene (1-2 mole %). As a result of its molecular structure, IIR possesses superior air impermeability, a high loss modulus, oxidative stability and extended fatigue resistance.

Butyl rubber is understood to be a copolymer of an isoolefin and one or more, preferably conjugated, multiolefins as comonomers. Commercial butyl comprise a major portion of isoolefin and a minor amount, not more than 2.5 mol %, of a conjugated multiolefin. Butyl rubber or butyl polymer is generally prepared in a slurry process using methyl chloride as a vehicle and a Friedel-Crafts catalyst as part of the polymerization initiator. This process is further described in U.S. Pat. No. 2,356,128 and Ullmanns Encyclopedia of Industrial Chemistry, volume A 23, 1993, pages 288-295.

Peroxide curable butyl rubber compounds offer several advantages over conventional, sulfur-curing, systems. Typically, these compounds display extremely fast cure rates and the resulting cured articles tend to possess excellent heat resistance. In addition, peroxide-curable formulations are considered to be "clean" in that they do not contain any extractable inorganic impurities (e.g., sulfur). The clean rubber articles can therefore be used, for example, in condenser caps, biomedical devices, pharmaceutical devices (stoppers in medicine-containing vials, plungers in syringes) and possibly in seals for fuel cells.

It is well accepted that polyisobutylene and butyl rubber decompose under the action of organic peroxides. Furthermore, U.S. Pat. Nos. 3,862,265 and 4,749,505 teach us that copolymers of a $C_4$ to $C_7$ isomonoolefin with up to 10 wt. % isoprene or up to 20 wt. % para-alkylstyrene undergo a molecular weight decrease when subjected to high shear mixing. This effect is enhanced in the presence of free radical initiators.

In spite of this, CA 2,418,884 and 2,458,741 describe the preparation of butyl-based, peroxide-curable compounds which have high multiolefin content. Specifically, CA 2,418,884 describes the continuous preparation of IIR with isoprene levels ranging from 3 to 8 mol %. Halogenation of this high multiolefin butyl rubber produces a reactive allylic halide functionality within the elastomer. With these elevated levels of isoprene now available, it is possible, in principle, to generate BIIR analogues which contain allylic bromide functionalities ranging from 3 to 8 mol %. In essence, the relative levels of isoprene and allylic bromide can be tuned within this range. Conventional butyl rubber halogenation processes are described in, for example, Ullmann's Encyclopedia of Industrial Chemistry (Fifth, Completely Revised Edition, Volume A231 Editors Elvers, et al.) and/or "Rubber Technology" (Third Edition) by Maurice Morton, Chapter 10 (Van Nostrand Reinhold Company© 1987), particularly pp. 297-300.

In addition to enabling the co-vulcanization of halobutyl rubber with other general-purpose rubbers, the presence of allylic halide functionalities allows for nucleophilic alkylation reactions. It has been recently shown that treatment of brominated butyl rubber (BIIR) with nitrogen and/or phosphorus based nucleophiles, in the solid state, leads to the generation of IIR-based ionomers with interesting physical and chemical properties (see: Parent, J. S.; Liskova, A.; Whitney, R. A; Resendes, R. *Journal of Polymer Science, Part A*: Polymer Chemistry 43, 5671-5679, 2005; Parent, J. S.; Liskova, A.; Resendes, R. *Polymer* 45, 8091-8096, 2004; Parent, J. S.; Penciu, A.; Guillen-Castellanos, S. A.; Liskova, A.; Whitney, R. A. *Macromolecules* 37, 7477-7483, 2004).

Existing Butyl elastomer grades are used in a variety of applications where the inherent low gas permeation rate is of great importance. The adhesion of butyl rubber to solid surfaces is an important physical property that leads to the formation of composite materials. For example, in multi pane gas filled glass window seals, the low permeation of Butyl elastomers allows the retention of special gases of low thermally conductivity over the life of the window. As the ever-increasing demand for improved energy efficiency drives improvements in window design, better adhesion properties in window seals are required. However, existing butyl rubber polymers exhibit only moderate adhesion to glass surfaces and as a result have deficiencies when used in glass-polymer composite applications. The same is true of metal-polymer and plastic-polymer composite applications.

The publication Bayer—Manual for the Rubber industry $2^{nd}$ Edition at Page 512 table D10-1 and at page 514 table D10-2 as well as page 515 table D10-4 highlights the poor adhesion of Butyl elastomers to steel, rayon, polyamide and polyester. In thermoset rubber compounds the poor adhesion of Butyl rubber is partially overcome with a laborious process of coating the fabric/steel with a resorcinol, formaldehyde, latex, isocyanate RFL bonding system. In addition a resorcinol, formaldehyde, silica RFS bonding system is incorporated into the thermoset rubber compound. Even with these efforts an adhesion rating of 3, 2, and 0 (0-5 scale, with 5 being excellent) is all that can be expected for rayon, polyamide and regular finish polyester, respectively.

There is therefore a need for improving adhesion between butyl rubber and glass, metal and/or plastic surfaces.

In the past, butyl rubber polymers have exhibited adhesion values of less than 15 psi for stainless steel, less than 10 psi for glass and less than 5 psi for mylar. Improvements in these adhesion values are constantly being sought. To date no attempts have been made to characterize adhesion between butyl rubber ionomers and glass, metal or plastic surfaces.

The need therefore still exists for a butyl polymer having improved surface adhesion characteristics and for composite articles made therefrom.

SUMMARY OF THE INVENTION

According to the present invention, there is provided a butyl rubber ionomer comprising: repeating units derived from at least one isoolefin monomer; at least 0.5 mol % of repeating units derived from at least one multiolefin monomer, at least 0.5 mol % of repeating units derived from an allylic halide and at least 0.5 mol % of an ionomeric moiety; and, the butyl rubber ionomer having an adhesion to a substrate surface at least 25% greater than the adhesion of a non-ionomeric butyl rubber to the same substrate surface.

According to another aspect of the present invention, there is provided a peroxide cured composite article made from the foregoing butyl rubber ionomer.

According to yet another aspect of the present invention, there is provided a composite article comprising: a butyl rubber ionomer comprising: repeating units derived from at least one isoolefin monomer; at least 0.5 mol % of repeating units derived from at least one multiolefin monomer, at least 0.5 mol % of repeating units derived from an allylic halide and at least 0.5 mol % of an ionomeric moiety; a substrate comprising a stainless steel material, a glass material or a mylar material; and, wherein the adhesion of the butyl rubber ionomer to the substrate surface is at least 25% greater than the adhesion of a non-ionomeric butyl rubber to the same substrate surface.

The present invention is advantageous in applications where increased adhesion between rubber and substrate surfaces is required, such as in steel belting of tires, vibration isolation in windows, improved sail materials for sailing vessels, and the like.

Further features of the invention will be described in the following detailed description.

DETAILED DESCRIPTION OF PREFERRED EMBODIMENTS

The butyl rubber ionomer is prepared from a halogenated butyl rubber polymer. Butyl rubber polymers are generally derived from at least one isoolefin monomer, at least one multiolefin monomer and optionally further copolymerizable monomers.

The butyl rubber polymer is not limited to a special isoolefin. However, isoolefins within the range of from 4 to 16 carbon atoms, preferably 4-7 carbon atoms, such as isobutene, 2-methyl-1-butene, 3-methyl-1-butene, 2-methyl-2-butene, 4-methyl-1-pentene and mixtures thereof are preferred. More preferred is isobutene.

The butyl rubber polymer is not limited to a special multiolefin. Every multiolefin copolymerizable with the isoolefin known by the skilled in the art can be used. However, multiolefins with in the range of from 4-14 carbon atoms, such as isoprene, butadiene, 2-methylbutadiene, 2,4-dimethylbutadiene, piperyline, 3-methyl-1,3-pentadiene, 2,4-hexadiene, 2-neopentylbutadiene, 2-methly-1,5-hexadiene, 2,5-dimethly-2,4-hexadiene, 2-methyl-1,4-pentadiene, 2-methyl-1,6-heptadiene, cyclopenta-diene, methylcyclopentadiene, cyclohexadiene, 1-vinyl-cyclohexadiene and mixtures thereof, preferably conjugated dienes, are used. Isoprene is more preferably used.

As optional monomers, any monomer copolymerizable with the isoolefins and/or dienes known by the skilled in the art can be used. α-methyl styrene, p-methyl styrene, chlorostyrene, cyclopentadiene and methylcyclopentadiene are preferably used. Indene and other styrene derivatives may also be used. β-pinene can also be used as a co-monomer for the isoolefin.

In one embodiment, the butyl rubber ionomer is prepared from a high multiolefin butyl rubber polymer. The preparation of a suitable high multiolefin butyl rubber polymer is described in co-pending application CA 2,418,884, which is incorporated herein by reference. The reaction mixture used to produce the high multiolefin containing butyl polymer further contains a multiolefin cross-linking agent. The term cross-linking agent is known to those skilled in the art and is understood to denote a compound that causes chemical cross-linking between the polymer chains in opposition to a monomer that will add to the chain. Some easy preliminary tests will reveal if a compound will act as a monomer or a cross-linking agent. The choice of the cross-linking agent is not restricted. Preferably, the cross-linking contains a multi-olefinic hydrocarbon compound. Examples of these include norbornadiene, 2-isopropenylnorbornene, 2-vinyl-norbornene, 1,3,5-hexatriene, 2-phenyl-1,3-butadiene, divinylbenzene, diisopropenylbenzene, divinyltoluene, divinylxylene and $C_1$ to $C_{20}$ alkyl-substituted derivatives thereof. More preferably, the multiolefin crosslinking agent is divinyl-benzene, diiso-propenylbenzene, divinyltoluene, divinyl-xylene and $C_1$ to $C_{20}$ alkyl substituted derivatives thereof, and or mixtures of the compounds given. Most preferably the multiolefin crosslinking agent contains divinylbenzene and diisopropenylbenzene.

Preferably, the monomer mixture used to prepare the high multiolefin butyl polymer contains in the range of from 80% to 96% by weight of at least one isoolefin monomer and in the range of from 3.0% to 20% by weight of at least one multiolefin monomer and/or β-pinene and in the range of from 0.01% to 1% by weight of at least one multiolefin cross-linking agent. More preferably, the monomer mixture contains in the range of from 83% to 94% by weight of at least one isoolefin monomer and in the range of from 5.0% to 17% by weight of a multiolefin monomer or β-pinene and in the range of from 0.01% to 1% by weight of at least one multiolefin cross-linking agent. Most preferably, the monomer mixture contains in the range of from 85% to 93% by weight of at least one isoolefin monomer and in the range of from 6.0% to 15% by weight of at least one multiolefin monomer, including β-pinene and in the range of from 0.01% to 1% by weight of at least one multiolefin cross-linking agent.

The weight average molecular weight of the high multiolefin butyl polymer ($M_w$), is preferably greater than 240 kg/mol, more preferably greater than 300 kg/mol, even more preferably greater than 500 kg/mol, most preferably greater than 600 kg/mol.

The gel content of the high multiolefin butyl polymer is preferably less than 5 wt. %, more preferably less than 3 wt. %, even more preferably less than 1 wt. %, most preferably less than 0.5 wt. %. In connection with the present invention the term "gel" is understood to denote a fraction of the polymer insoluble for 60 min in cyclohexane boiling under reflux.

A regular butyl polymer contains at least 0.5 mol %, preferably at least 0.75 mol %, more preferably at least 1.0 mol %, yet more preferably at least 1.5 mol %, still more preferably at least 2.0 mol %, even more preferably at least 2.5 mol % of repeating units derived from at least one multiolefin monomer. A high multiolefin butyl polymer contains at least 3.0 mol %, preferably at least 4.0 mol %, more preferably at least 5.0 mol %, yet more preferably at least 6.0 mol %, still more preferably at least 7.0 mol % of repeating units derived from at least one multiolefin monomer.

The regular butyl polymer or high multiolefin butyl polymer can then be subjected to a halogenation process in order to produce a halobutyl polymer. Bromination or chlorination can be performed according to the process known by those skilled in the art, for example, the procedures described in Rubber Technology, 3rd Ed., Edited by Maurice Morton, Kluwer Academic Publishers, pp. 297-300 and further documents cited therein. A further example is provided in a co-pending application by Resendes, et al., entitled "Method of Halogenating Butyl Rubber Without Acid Neutralization Agents", which is incorporated herein by reference.

During halogenation, some or all of the multiolefin content of the butyl polymer is converted to allylic halides. The allylic halides in the halobutyl polymer are therefore repeating units derived from the multiolefin monomers originally present in the butyl polymer. Of course, there may be residual multiolefin content in the halobutyl polymer and there may then be both allylic halides and non-halogenated multiolefins present within the same polymer. However, the total allylic halide content of the halobutyl polymer cannot exceed the starting multiolefin content of the parent butyl polymer. For example, a halobutyl polymer having 0.5 mol % of allylic halides would also, by definition, have at least 0.5 mol % of repeating units derived from the multiolefin monomer, and could very well have residual multiolefin content, especially when high multiolefin butyl polymers are used as the starting material for the halobutyl polymer. Accordingly, in the present invention halobutyl polymers contain at least 0.5 mol %, more preferably at least 0.75 mol %, yet more preferably at least 1.0 mol %, even more preferably at least 1.5 mol % of allylic halides and/or repeating units derived from allylic halides and may contain residual multiolefins.

The halobutyl polymer can then be reacted with at least one nitrogen and/or phosphorus containing nucleophile according to the following formula,

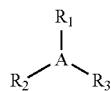

wherein:

A is a nitrogen or phosphorus; and, $R_1$, $R_2$ and $R_3$ are selected from the group consisting of linear or branched $C_1$-$C_{18}$ alkyl substituents, an aryl substituent which is monocyclic or composed of fused $C_4$-$C_8$ rings, and/or a hetero atom selected from, for example, B, N, O, Si, P, and S.

In general, the appropriate nucleophile will contain at least one neutral nitrogen or phosphorus center which possesses a lone pair of electrons which is both electronically and sterically accessible for participation in nucleophilic substitution reactions. Suitable nucleophiles include trimethylamine, triethylamine, triisopropylamine, tri-n-butylamine, trimethylphosphine, triethylphosphine, triisopropylphosphine, tri-n-butylphosphine, and triphenylphosphine.

The amount of nucleophile reacted with the butyl rubber may be in the range from 1 to 5 molar equivalents, more preferably 1.5 to 4 molar equivalents and even more preferably 2 to 3 molar equivalents based on the total molar amount of allylic halide present in the halobutyl polymer.

The halobutyl polymer and the nucleophile can be reacted for about 10 to 90 minutes, preferably from 15 to 60 minutes and more preferably from 20 to 30 minutes at temperatures ranging from 80 to 200° C., preferably from 90 to 160° C. and more preferably from 100 to 140° C.

Since the nucleophile reacts with the allylic halide functionality of the halobutyl polymer, the resulting ionomeric moiety is a repeating unit derived from an allylic halide. The total content of ionomeric moiety in the butyl ionomer therefore cannot exceed the starting amount of allylic halide in the halobutyl polymer; however, residual allylic halides and/or residual multiolefins may be present. The resulting halobutyl based ionomer preferably possesses at least 0.5 mol %, preferably at least 0.75 mol %, more preferably at least 1.0 mol %, yet more prefereably at least 1.5 mol % of the ionomeric moiety. Residual allylic halides may be present in an amount of from 0.1 mol % up to an amount not exceeding the original allylic halide content of the halobutyl polymer used to produce the butyl ionomer. Residual multiolefin may be present in an amount of from 0.1 mol % up to an amount not exceeding the original multiolefin content of the butyl polymer used to produce the halobutyl polymer. Typically, the residual multiolefin content of the ionomer is from 0.1 to 6 mol %, preferably from 0.2 to 5 mol %, more preferably from 0.3 to 4 mol %, yet more preferably from 0.4 to 3 mol %, even more preferably from 0.5 to 2 mol %, still more preferably from 0.7 to 1.5 mol %, especially when the butyl ionomer is based upon a high multiolefin butyl polymer.

The butyl rubber ionomer exhibits improved adhesion to surfaces having polar functional groups. The butyl rubber ionomer exhibits an adhesion to a given substrate surface at least 25% greater than the adhesion of a non-ionomeric butyl rubber to the same substrate surface, preferably at least 50% greater, more preferably at least 100% greater, yet more preferably at least 150% greater, yet more preferably at least 200% greater. A greater content of ionomeric moiety in the ionomer may lead to a greater improvement in adhesion. The ionomer may exhibit a greater improvement in adhesion to some substrate surfaces than to others. Specifically, the ionomer may have an adhesion to stainless steel of at least 25 psi, an adhesion to glass of at least 20 psi, or an adhesion to mylar of at least 10 psi.

When high multiolefin content halobutyl rubber is used to prepare the butyl rubber ionomer, the ionomer may have at least 1.5 mol % residual multiolefin monomer, preferably isoprene. Preferably, the butyl rubber ionomer prepared from high multiolefin halobutyl rubber has at least 3.5 mol % residual 1,4 isoprene. The butyl rubber ionomer made from high multiolefin halobutyl rubber exhibits even greater improved adhesion to surfaces having polar functional groups. The butyl rubber ionomer made from high multiolefin halobutyl rubber may exhibit an adhesion at least 150% greater than the adhesion of a non-ionomeric butyl rubber to the same substrate surface, preferably at least 200% greater. Specifically, the butyl rubber ionomer made from high multiolefin halobutyl rubber preferably exhibits an adhesion to stainless steel of at least 35 psi, an adhesion to glass of at least 30 psi or an adhesion to mylar of at least 15 psi. More preferably, the adhesion to mylar is at least 20 psi, yet more preferably at least 25 psi.

When measuring the improvement in adhesion between a butyl ionomer and a non-ionomeric butyl rubber, the butyl rubber used as a reference standard should be nearly identical to the butyl ionomer, except for the ionomeric moiety content. For example, the residual unsaturation of the butyl ionomer should be nearly identical to the unsaturation of the butyl rubber being used as an adhesion reference material. The test methods used to test the ionomer and the butyl rubber reference material should also be identical. Only trace differences between the ionomer and the butyl rubber reference are permissible. In this manner, the improvement in adhesion can be solely attributed to the presence of ionomeric functionality in the ionomer and not to some other properties of the ionomer or of the reference material.

In a preferred embodiment, the ionomer may contain in the range of 0.1 to 20 phr of an organic fatty acid, preferably an unsaturated fatty acid having one, two or more carbon double bonds in the molecule, which more preferably includes 10% by weight or more of a conjugated diene acid having at least one conjugated carbon-carbon double bond in its molecule. Preferably those fatty acids have in the range of from 8-22 carbon atoms, more preferably 12-18. Examples include stearic acid, palmic acid and oleic acid and their calcium-, zinc-, magnesium-, potassium-, sodium- and ammonium salts. Composite articles can be made from either of the foregoing butyl rubber ionomers utilizing as substrates materials having surfaces a stainless steel material, a glass material, or a mylar material.

Cured articles can also be made from the butyl rubber ionomer and/or the composite material. Preferably, the articles are peroxide cured. In curing the ionomer, there are many suitable peroxide curing agents that may be used, for example, dicumyl peroxide, di-tert.-butyl peroxide, benzoyl peroxide, 2,2'-bis tert.-butylperoxy diisopropylbenzene (Vulcup® 40KE), benzoyl peroxide, 2,5-dimethyl-2,5-di(tert-butylperoxy)-hexyne-3, 2,5-dimethyl-2,5-di(benzoylperoxy) hexane, (2,5-bis(tert.-butylperoxy)-2,5-dimethyl hexane and the like. The best suited curing agents are readily ascertained by means of a few preliminary experiments. A preferred peroxide curing agent comprising dicumyl peroxide is commercially available under the trademark DiCup™ 40C. The peroxide curing agent is suitably used in an amount of 0.2 to 10 parts per hundred parts of rubber (phr), preferably 1 to 6 phr, more preferably about 4 phr.

Vulcanizing co-agents known to be suitable by those skilled in the art can also be used. Mention is made of triallyl isocyanurate (TAIC), commercially available under the trademark DIAK 7 from DuPont or N,N'-m-phenylene dimaleimide known as HVA-2™ (DuPont Dow), triallyl cyanurate (TAC) or liquid polybutadiene known as Ricon™ D 153 (supplied by Ricon Resins). Amounts can be equivalent to the peroxide curative or less.

An antioxidant may also be included in the ionomer, suitably in an amount up to 4 phr, preferably about 2 phr. Examples of suitable antioxidants include p-dicumyl diphenylamine (Naugard® 445), Vulkanox® DDA (a diphenylamine derivative), Vulkanox® ZMB2 (zinc salt of methylmercapto benzimidazole), Vulkanox® HS (polymerized 1,2-dihydro-2,2,4-trimethyl quinoline) and Irganox® 1035 (thiodiethylene bis(3,5-di-tert.-butyl-4-hydroxy) hydrocinnamate or thiodiethylene bis(3-(3,5-di-tert.-butyl-4-hydroxyphenyl)propionate supplied by Ciba-Geigy. Vulkanox is a trademark of Lanxess Inc.

The cured article may contain further auxiliary products for rubbers, such as reaction accelerators, vulcanizing accelerators, vulcanizing acceleration auxiliaries, antioxidants, foaming agents, anti-aging agents, heat stabilizers, light stabilizers, ozone stabilizers, processing aids, plasticizers, tackifiers, blowing agents, dyestuffs, pigments, waxes, extenders, organic acids, inhibitors, metal oxides, and activators such as triethanolamine, polyethylene glycol, hexanetriol, etc., which are known to the rubber industry. The rubber aids are used in conventional amounts that depend, inter alia, on the intended use. The cured article may also contain mineral and/or non-mineral fillers. Conventional amounts are from 0.1 to 50 wt. %, based on rubber.

Mineral fillers according to the present invention are composed of particles of a mineral; suitable fillers include silica, silicates, clay (such as bentonite and Montmorillonite nano clays), organophilicly modified clays, gypsum, alumina, titanium dioxide, talc and the like, as well as mixtures thereof.

Further examples of suitable mineral fillers include: highly dispersible silicas, prepared e.g. by the precipitation of silicate solutions or the flame hydrolysis of silicon halides, with specific surface areas of 5 to 1000, preferably 20 to 400 m$^2$/g (BET specific surface area), and with primary particle sizes of 10 to 400 nm; the silicas can optionally also be present as mixed oxides with other metal oxides such as Al, Mg, Ca, Ba, Zn, Zr and Ti; synthetic silicates, such as aluminum silicate and alkaline earth metal silicate; magnesium silicate or calcium silicate, with BET specific surface areas of 20 to 400 m$^2$/g and primary particle diameters of 10 to 400 nm; natural silicates, such as kaolin and other naturally occurring silicates and clays; glass fibers and glass fiber products (matting, extrudates) or glass microspheres; metal oxides, such as zinc oxide, calcium oxide, magnesium oxide and aluminum oxide; metal carbonates, such as magnesium carbonate, calcium carbonate and zinc carbonate; and, metal hydroxides, e.g. aluminum hydroxide and magnesium hydroxide or combinations thereof.

Because these mineral particles have hydroxyl groups on their surface, rendering them hydrophilic and oleophobic, it is difficult to achieve good interaction between the filler particles and the butyl elastomer. If desired, the interaction between the filler particles and the polymer can be enhanced by the introduction of silica modifiers. Non-limiting examples of such modifiers include bis-[-(triethoxysilyl)-propyl]-tetrasulfide, bis-[-(triethoxysilyl)-proply]-disulfide, N,N,-dimethylethanolamine, ethanolamine, triethoxysilylpropyl-thiol and triethoxyvinylsilane.

For many purposes, the preferred mineral is silica, especially silica prepared by the carbon dioxide precipitation of sodium silicate.

Dried amorphous silica particles suitable for use as mineral fillers in accordance with the present invention have a mean agglomerate particle size in the range of from 1 to 100 microns, preferably between 10 and 50 microns and more preferably between 10 and 25 microns. It is preferred that less than 10 percent by volume of the agglomerate particles are below 5 microns or over 50 microns in size. A suitable amorphous dried silica has a BET surface area, measured in accordance with DIN (Deutsche Industrie Norm) 66131, of between 50 and 450 square meters per gram and a DBP absorption, as measured in accordance with DIN 53601, of between 150 and 400 grams per 100 grams of silica, and a drying loss, as measured according to DIN ISO 787/11, of from 0 to 10 percent by weight. Suitable silica fillers are commercially available under the trademarks HiSil 210, HiSil 233 and HiSil 243 available from PPG Industries Inc. Also suitable are Vulkasil S™ and Vulkasil N™, commercially available from Lanxess Inc.

Mineral fillers can also be used in combination with known non-mineral fillers, such as: carbon blacks—suitable carbon blacks are preferably prepared by the lamp black, furnace black or gas black process and have BET specific surface areas of 20 to 200 m$^2$/g, for example, SAF, ISAF, HAF, FEF or GPF carbon blacks; and/or, rubber gels, preferably those based on polybutadiene, butadiene/styrene copolymers, butadiene/acrylonitrile copolymers and polychloroprene.

In some embodiments, non-mineral fillers may be present in an amount up to 40 phr. It is preferred that the mineral filler should constitute at least 55% by weight of the total amount of filler.

The compounding and vulcanization may be carried out by a process known to those skilled in the art, such as the process disclosed in Encyclopedia of Polymer Science and Engineering, Vol. 4, S. 66 et seq. (Compounding) and Vol. 17, S. 666 et seq. (Vulcanization).

The invention is well suited for the manufacture of composite articles containing both an elastomer and a substrate material. These articles are particularly useful in a variety of applications, especially applications requiring the vibration dampening characteristics or gas impermeability characteristics of butyl rubber.

The invention is further illustrated with reference to the following examples.

EXAMPLES

Equipment $^1$H NMR spectra were recorded with a Bruker DRX500 spectrometer (500.13 MHz $^1$H) in CDCl$_3$ with chemical shifts referenced to tetramethylsilane. A Monsanto Tel-Tak Model TT-1 was used to determine the adhesion of uncured rubber samples to a variety of substrate surfaces, including such materials as stainless steel, glass, mylar, and Teflon™.

Methods

The adhesion test procedure was based upon ASTM D-429 Method A. This test determines the force required to achieve planar separation of an elastomer from a solid substrate. The compound being tested was initially sheeted from a two-roll mill and cut into 5"×3" sample sheets of varying thickness (0.020" to 0.130"). The sample sheets were then pressed into a 5"×3" mold containing square woven fabric using a 15 pound weight for 5 minutes at 100° C. The mold was backed by mylar on one side and aluminum on the other in order to preserve the integrity of the sample surfaces. The thickness of the molded specimens ranged from ⅟₁₆" to ½". The stainless steel and glass surfaces were cleaned and then preserved in glass jars containing ethanol, while the Teflon™ and mylar were wiped down with ethanol directly prior to testing. All surfaces were cut into test strips measuring ¼"×2"×⅟₁₆". Tests were performed within 16 hours of specimen preparation. Care was taken to prepare and preserve the integrity of all specimen surfaces.

When performing the adhesion tests, the rubber specimen was placed face up into the bottom of the sample holder of the Tel-Tak apparatus and the protective mylar layer was removed. The chosen substrate surface was polished with ethanol and placed into the top sample holder above the specimen. Both sample holders were then placed into the apparatus. The surfaces were moved into contact with one another and a built-in timer set to 60 s was automatically activated. A contact pressure of 32 psi was applied using the apparatus. Following the 60 s contact time, the specimen and substrate surfaces were separated from one another at a speed of 1 inch per minute, while constantly maintaining a parallel relationship between the surfaces. The force required to separate the specimen from the surface was measured using a calibrated force gauge with a capacity of 80 ounces and a built-in indicator for the maximum value. For ¼" samples, the maximum force value could be read directly from the force gauge in pounds per square inch (psi). Tests were carried out in triplicate and the mean values were reported.

Materials

All reagents, unless otherwise specified, were used as received from Sigma-Aldrich (Oakville, Ontario). BIIR (BB2030) was used as supplied by LANXESS Inc.

Example 1

Preparation of IIR Containing 6.5 mol % of Isoprene

The following example illustrates the continuous production of a novel grade of IIR possessing an isoprene content of up to 8.0 mol % and Mooney viscosity (ML 1+8@125° C.) between 35 and 40 MU.

The monomer feed composition was comprised of 4.40 wt. % of isoprene (IP or IC5) and 25.7 wt. % of isobutene (IP or IC4). This mixed feed was introduced into the continuous polymerization reactor at a rate of 5900 kg/hour. In addition, DVB was introduced into the reactor at a rate of 5.4 to 6 kg/hour. Polymerization was initiated via the introduction of an $AlCl_3$/MeCl solution (0.23 wt. % of $AlCl_3$ in MeCl) at a rate of 204 to 227 kg/hour. The internal temperature of the continuous reaction was maintained between −95 and −100° C. through the use of an evaporative cooling process. Following sufficient residence time within the reactor, the newly formed polymer crumb was separated from the MeCl diluent with the use of an aqueous flash tank. At this point, ca. 1 wt. % of Stearic acid was introduced into the polymer crumb. Prior to drying, 0.1 wt. % of the stabilizer Irganox® 1010 was added to the polymer. Drying of the resulting material was accomplished with the use of a conveyor oven. The resulting material was found to contain 6.5 mol % of isoprene by $^1H$ NMR analysis.

Example 2

Preparation of High Isoprene BIIR

To a solution of 7 kg of Example 1 in 31.8 kg of hexanes and 2.31 kg of water in a 95 L reactor was added with rapid agitation 110 mL of elemental bromine. After 5 minutes, the reaction was terminated via the addition of a caustic solution comprised of 76 g of NaOH in 1 L of water. Following an additional 10 minutes of agitation, a stabilizer solution comprised of 21.0 g of epoxidized soya-bean oil and 0.25 g of Irganox 1076 in 500 mL of hexanes and one comprised of 47.0 g of epoxidized soya-bean oil and 105 g of calcium stearate in 500 mL of hexanes was added to the reaction mixture. After an additional 1 h of agitation, the high IP BIIR was isolated by steam coagulation. The final material was dried to a constant weight with the use of a two roll 10"×20" mill operating at 100° C. The microstructure of the resulting material is presented in Table 1.

TABLE 1

| Microstructure of Example 2 | |
|---|---|
| Total Unsats (mol %) | 5.79 |
| 1,4 Isoprene (mol %) | 4.19 |
| Branched Isoprene (mol %) | 0.32 |
| Allylic Bromide (mol %) | 0.71 |
| Conjugated Diene (mol %) | 0.04 |
| Endo Br (mol %) | 0.07 |

Example 3

Preparation of IIR Ionomer 48 g of BB2030 and 4.7 g (3 molar equivalents based on allylic bromide content of Example 1) of triphenylphosphine were added to Brabender internal mixer (Capacity 75 g) operating at 100° C. and a rotor speed of 60 RPM. Mixing was carried out for a total of 60 minutes. Analysis of the final product by $^1H$ NMR confirmed the complete conversion of all the allylic bromide of Example 1 to the corresponding ionomeric species. The resulting material was also found to possess 0.4 mol % of residual 1,4-IP.

Example 4

Preparation of High Isoprene IIR Ionomer 48 g of Example 2 and 4.7 g (3 molar equivalents based on allylic bromide content of Example 1) of triphenylphosphine were added to Brabender internal mixer (Capacity 75 g) operating at 100° C. and a rotor speed of 60 RPM. Mixing was carried out for a total of 60 minutes. Analysis of the final product by $^1H$ NMR confirmed the complete conversion of all the allylic bromide of Example 2 to the corresponding ionomeric species. The resulting material was also found to possess 4.20 mol % of residual 1,4-IP.

Results and Discussion

As can be seen from the data presented in Table 2, a significant, surprising, increase in adhesion as determined through Tel-Tak measurements was observed for ionomers derived from BB2030 (Example 3) and Example 2 (Example 4). This observation would suggest that the ionomeric moieties found along the polymer backbone for both Examples 3 and 4 help to mediate the surface energy differences between the bulk IIR matrix and the surface in question. In addition, these polar ionomeric groups possess the ability to favourably interact with the polar functionalities present on the surfaces of both stainless steel and glass. Interestingly, the presence of elevated levels of residual isoprene as found in Example 4 (c.f. Example 3) positively influences the adhesive strength of this material.

TABLE 2

Adhesion as Determined through Tel-Tak Testing.

| Surface | Average Adhesion (psi) | | | |
| --- | --- | --- | --- | --- |
| | BB2030 | Example 2 | Example 3 | Example 4 |
| Stainless Steel | 11.3 | 9.7 | 30.3 | 38.3 |
| Glass | 6.0 | 7.0 | 27.3 | 33.0 |
| Mylar | 2.0 | 5.0 | 13.7 | 29.3 |
| Teflon | 1.5 | 3.0 | 3.7 | 3.8 |

As can be seen from the examples described above, the treatment of a high isoprene analogue of BIIR (Example 2) with a neutral phosphorus based nucleophile results in the formation of the corresponding high IP IIR ionomer (Example 4). Additionally, the treatment of BB2030 with a neutral phosphorus based nucleophile results in the formation of the corresponding IIR-based ionomer (Example 3). Interestingly, a significant increase in adhesion (as determined through Tel-Tak analysis) was observed for the ionomeric analogues of both BB2030 and Example 2. Importantly, the elevated levels of residual isoprene found in Example 4 (c.f. Example 3) seem to further enhance this particular materials adhesive strength. Adhesion to mylar was greater than adhesion to Teflon. It is speculated that the improved adhesion to mylar is due to its relative hydrophilicity compared with Teflon. Adhesion to substrates having polar surface characteristics is therefore expected to be greater than adhesion to non-polar surfaces. In general, the conversion of commercial BIIR (e.g. BB2030) or BIIR with elevated levels of isoprene (e.g. Example 2) to the corresponding ionomeric species results in a significant improvement in adhesion to a variety of surfaces. As already mentioned, the presence of elevated levels of residual isoprene further enhances the adhesive strength.

The foregoing describes preferred embodiments of the invention and other features and embodiments of the invention will be evident to persons skilled in the art. The following claims are to be construed broadly with reference to the foregoing and are intended by the inventor to include other variations and sub-combinations that are not explicitly claimed.

The invention claimed is:

1. A butyl rubber ionomer comprising:
 a) repeating units derived from at least one isoolefin monomer; at least 0.5 mol % of repeating units derived from at least one multiolefin monomer, at least 0.5 mol % of repeating units derived from an allylic halide and at least 0.5 mol % of an ionomeric moiety; and,
 b) the butyl rubber ionomer having an adhesion to a substrate surface at least 25% greater than the adhesion of a non-ionomeric butyl rubber to the same substrate surface.

2. The butyl rubber ionomer of claim 1, wherein the isoolefin comprises isobutylene, the multiolefin comprises isoprene and the allylic halide comprises a bromide.

3. The butyl rubber ionomer of claim 1, further comprising at least 0.3 mol % of residual multiolefin.

4. The butyl rubber ionomer of claim 1, comprising at least 3.5 mol % of repeating units derived from the at least one multiolefin monomer.

5. The butyl rubber ionomer of claim 4, further comprising at least 1.5 mol % of residual multiolefin.

6. The butyl rubber ionomer of claim 1, wherein the substrate surface is stainless steel, glass, mylar or Teflon™.

7. The butyl rubber ionomer of claim 1, having an adhesion to stainless steel of at least 35 psi, an adhesion to glass of at least 30 psi, an adhesion to mylar of at least 15 psi or an adhesion to Teflon™ of at least 3.75 psi.

8. The butyl rubber ionomer of claim 1, having an adhesion to mylar of at least 25 psi.

9. The butyl rubber ionomer of claim 1, wherein the butyl rubber ionomer has an adhesion to the substrate surface at least 150% greater than the adhesion of the non-ionomeric butyl rubber to the same substrate surface.

10. A peroxide cured article made from a butyl rubber ionomer according to claim 1.

11. A composite article comprising:
 a) a butyl rubber ionomer comprising: repeating units derived from at least one isoolefin monomer; at least 0.5 mol % of repeating units derived from at least one multi-olefin monomer, at least 0.5 mol % of repeating units derived from an allylic halide and at least 0.5 mol % of an ionomeric moiety;
 b) a substrate comprising a stainless steel material, a glass material or a mylar material; and,
 c) wherein the adhesion of the butyl rubber ionomer to the substrate surface is at least 25% greater than the adhesion of a non-ionomeric butyl rubber to the same substrate surface.

12. The composite article of claim 11, wherein the isoolefin comprises isobutylene, the multiolefin comprises isoprene and the allylic halide comprises a bromide.

13. The composite article of claim 11, further comprising at least 0.3 mol % of residual multiolefin.

14. The composite article of claim 11, comprising at least 3.5 mol % of repeating units derived from the at least one multiolefin monomer.

15. The composite article of claim 14, further comprising at least 1.5 mol % of residual multiolefin.

16. The composite article of claim 11, wherein the substrate surface is stainless steel, glass, mylar or Teflon™.

17. The composite article of claim 11, having an adhesion to stainless steel of at least 35 psi, an adhesion to glass of at least 30 psi, an adhesion to mylar of at least 15 psi or an adhesion to Teflon™ of at least 3.75 psi.

18. The composite article of claim 1, having an adhesion to mylar of at least 25 psi.

19. The composite article of claim 11, wherein the adhesion of the butyl rubber ionomer to the substrate surface is at least 150% greater than the adhesion of the non-ionomeric butyl rubber to the same substrate surface.

20. The composite article according to claim 11, wherein the article is peroxide cured.

* * * * *